(12) United States Patent
Kristoffersen et al.

(10) Patent No.: US 9,976,363 B2
(45) Date of Patent: May 22, 2018

(54) OFFSHORE FLEXIBLE LINE INSTALLATION AND REMOVAL

(71) Applicant: STATOIL PETROLEUM AS, Stavanger (NO)

(72) Inventors: Steinar Kristoffersen, Kolsås (NO); Øyvind Haug, Lillestrøm (NO); Guillaume Gravey, Oslo (NO)

(73) Assignee: STATOIL PETROLEUM AS, Stavanger (NO)

( * ) Notice: Subject to any disclaimer, the term of this patent is extended or adjusted under 35 U.S.C. 154(b) by 0 days. days.

(21) Appl. No.: 15/037,913

(22) PCT Filed: Nov. 20, 2013

(86) PCT No.: PCT/EP2013/074263
§ 371 (c)(1),
(2) Date: May 19, 2016

(87) PCT Pub. No.: WO2015/074687
PCT Pub. Date: May 28, 2015

(65) Prior Publication Data
US 2016/0290070 A1      Oct. 6, 2016

(51) Int. Cl.
*E21B 19/00*      (2006.01)
*E21B 17/01*      (2006.01)
(Continued)

(52) U.S. Cl.
CPC .......... *E21B 19/004* (2013.01); *E21B 17/015* (2013.01); *E21B 19/22* (2013.01); *H02G 1/10* (2013.01); *E21B 17/012* (2013.01)

(58) Field of Classification Search
USPC ............ 405/158, 166, 168.3, 171, 172, 173, 405/168.1, 169
See application file for complete search history.

(56) References Cited

U.S. PATENT DOCUMENTS 3,698,199 A       10/1972   Matthews, Jr.
3,934,647 A  *    1/1976    Bokenkamp .......... E21B 43/013
                                                       166/347
(Continued)

FOREIGN PATENT DOCUMENTS

FR      2 859 495 A1     3/2005
GB      2 313 889 A     12/1997
(Continued)

*Primary Examiner* — Sean D Andrish
(74) *Attorney, Agent, or Firm* — Birch, Stewart, Kolasch & Birch, LLP (57) ABSTRACT

A method of installing a flexible line between an offshore platform and a subsea structure and a method of removing a flexible line deployed between an offshore platform and a subsea structure. The method of installing includes at least partially deploying the line in the water using an installation vessel located outside of an exclusion zone in the vicinity of the platform, including lowering a topside end of the line either to the seabed or to an intermediate location between the seabed and the platform. The method further includes pulling the topside end to a position within the exclusion zone and winching the topside end up to the platform, and coupling the topside end to the platform. The method of removing includes decoupling a topside end of the riser from the platform, lowering the topside end from the platform and pulling the topside end to a position outside of an exclusion zone in the vicinity of the platform, and at least partially removing the line from the water using an installation vessel located outside of the exclusion zone, including raising the topside end of the line onto the installation vessel either from the seabed or from an intermediate location between the seabed and the platform.

11 Claims, 10 Drawing Sheets

(51) Int. Cl.
*H02G 1/10* (2006.01)
*E21B 19/22* (2006.01)

(56) References Cited

U.S. PATENT DOCUMENTS

| | | |
|---|---|---|
| 4,588,326 A | 5/1986 | Langner |
| 2008/0014026 A1 | 1/2008 | Routeau et al. |
| 2009/0191001 A1 | 7/2009 | Headworth |
| 2010/0018717 A1* | 1/2010 | Espinasse ............. E21B 17/012 166/346 |
| 2010/0104373 A1* | 4/2010 | Pollack ............... E21B 43/0107 405/169 |
| 2012/0207547 A1 | 8/2012 | Guzick et al. |

FOREIGN PATENT DOCUMENTS

| | | |
|---|---|---|
| GB | 2 380 747 A | 4/2003 |
| WO | WO 03/074353 A1 | 9/2003 |
| WO | WO 2011/099869 * | 8/2011 |
| WO | WO 2011/099869 A2 | 8/2011 |
| WO | WO 2012/007790 A1 | 1/2012 |

* cited by examiner

Figure 9 - top view

Figure 13 - top view

OFFSHORE FLEXIBLE LINE INSTALLATION AND REMOVAL

TECHNICAL FIELD

The present invention relates to the installation and removal of flexible lines between an offshore platform or vessel and a subsea structure. The invention is applicable, for example, to the installation of flexible risers, power cables, umbilicals and the like.

BACKGROUND

In the context of offshore hydrocarbon production, a riser is a tubular conduit that extends from a subsea structure to a production platform, for the purpose of conveying produced hydrocarbons from the well to the platform. The subsea structure may be a "christmas tree", riser base, Blowout Preventer (BOP), or some other structure. Flexible risers are particularly important for deep water wells.

Risers are configured in order to allow for movements of the platform relative to the subsea structure in both a horizontal and a vertical direction, and for the effects of ocean currents on the riser itself. Configurations include a "free hanging" configuration (where the riser extends substantially vertically down to the seabed and then horizontally along the seabed to the subsea structure, a reverse pliant wave configuration, a pliant wave configuration, a lazy S configuration, and other suitable configurations.

For riser removal and installation operations on platforms where the risers are exposed/hanging on the platform side, the normal methodology involves the use of an installation vessel (IV) in addition to the platform itself. The IV is equipped with industry-standard laying spread (normally Vertical Laying System—VLS) and reels/carousels/baskets for storage of risers. The IV can install the riser from both directions, i.e. either the subsea or the topside end of the riser may be installed first (subject for example to already in-place riser configuration, auxiliary equipment size, packing constraints etc.).

Figure 1:
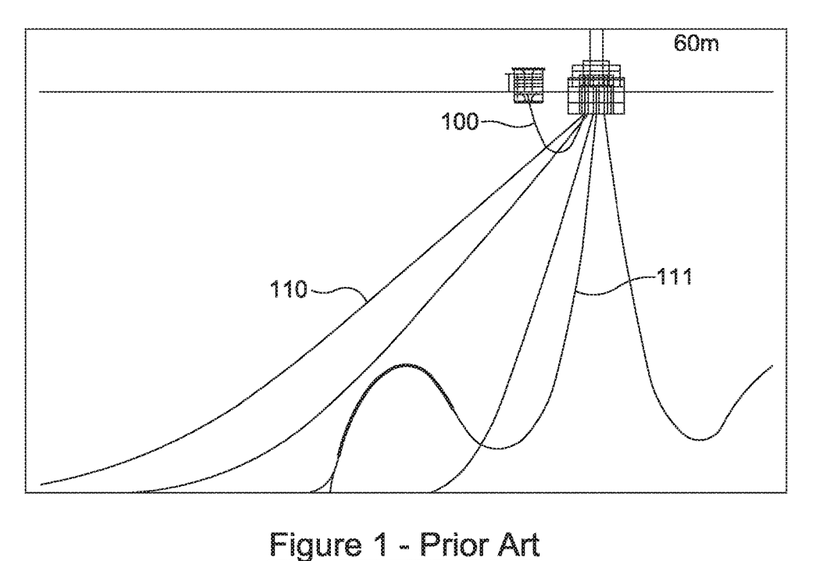
FIGS. 1 to 6 illustrate schematically a prior art procedure for installing a flexible riser between a semi-submersible platform and a subsea structure.

FIGS. 1 to 6 illustrate schematically various stages in the riser installation process in the case of floating production storage and offloading (FPSO), where the riser is being installed to achieve a reversed pliant wave configuration. Very generally, the process involves the following steps:

(1) An end of a pull-in wire 101, suspended from the platform (attached to the seabed by tethers 110), is transferred from the platform to the installation vessel (FIG. 1). FIG. 1 also shows an existing riser 111.

(2) The transferred end of the pull-in wire 101 is attached to the bottom of the riser 102 such that the pull-in wire 101 is now suspended between the platform and the riser 102. This bottom end of the riser 102 will subsequently be attached to the platform and so is referred to hereinafter as the "topside" end of the riser 102.

Figure 2:
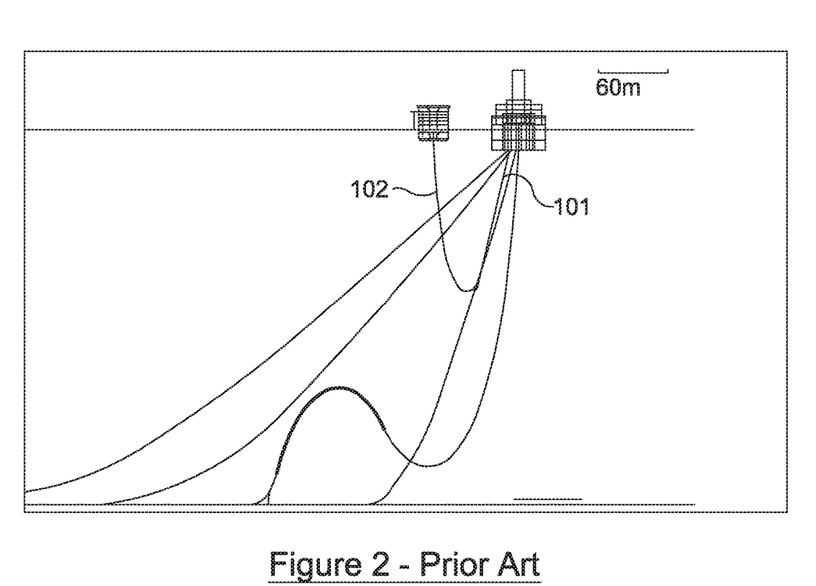

(3) The riser 102 is fed into the water from the installation vessel (FIG. 2). During this stage, the installation vessel steps away from the platform.

Figure 3:
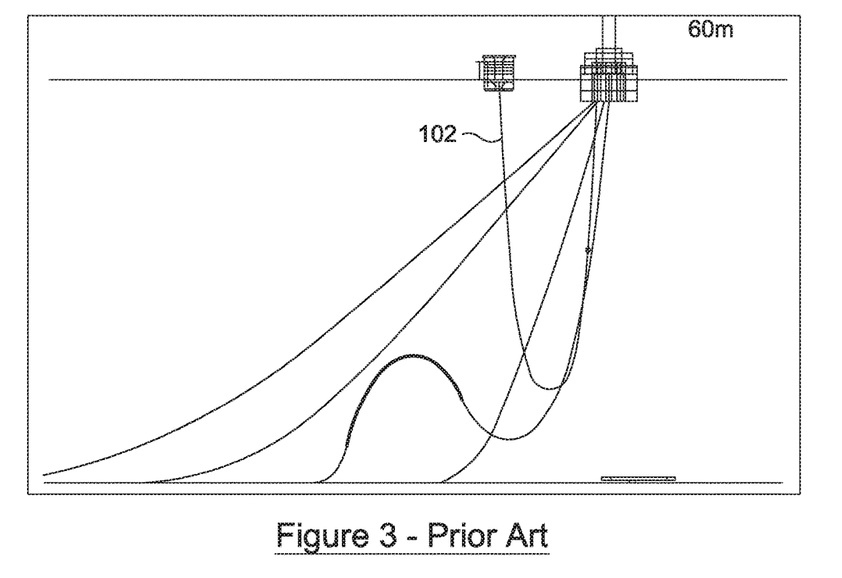
Figure 4:
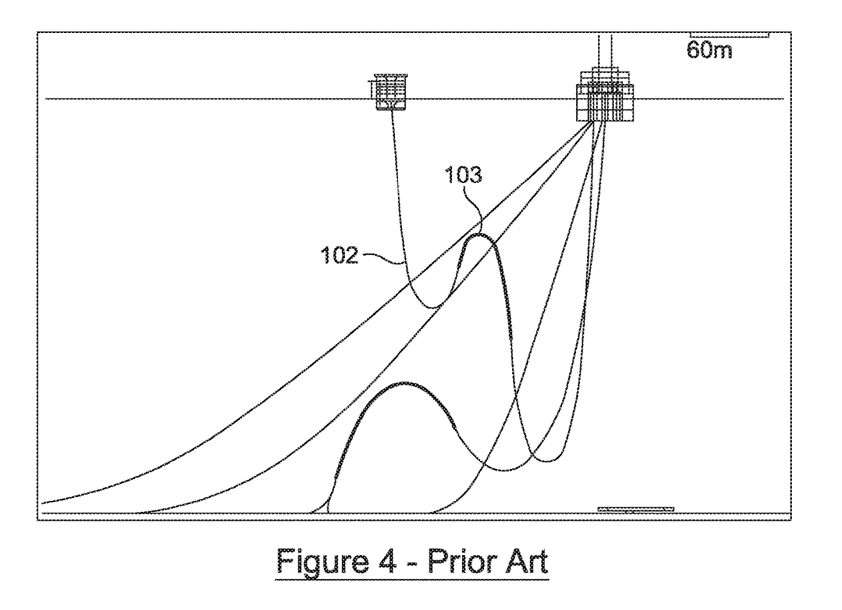

(4) At this stage, the riser 102 has adopted a U-shaped configuration in the water (FIG. 3). At some intermediate point in this procedure, buoyancy modules 103 are installed around the riser, over a certain length (FIG. 4). A pull-down clump weight (PDCW) may be required to pull-down the buoyant section in this phase.

(5) When the riser 102 has reached a certain depth into the water, the topside end is pulled up to the platform using the pull-in wire 101. The topside end of the riser is then installed to the appropriate connection on the platform ("hang-off").

(6) The installation vessel continues to lower the riser 102 and, as a result of the buoyant section of the riser, the curvature inverts (FIG. 4).

Figure 5:
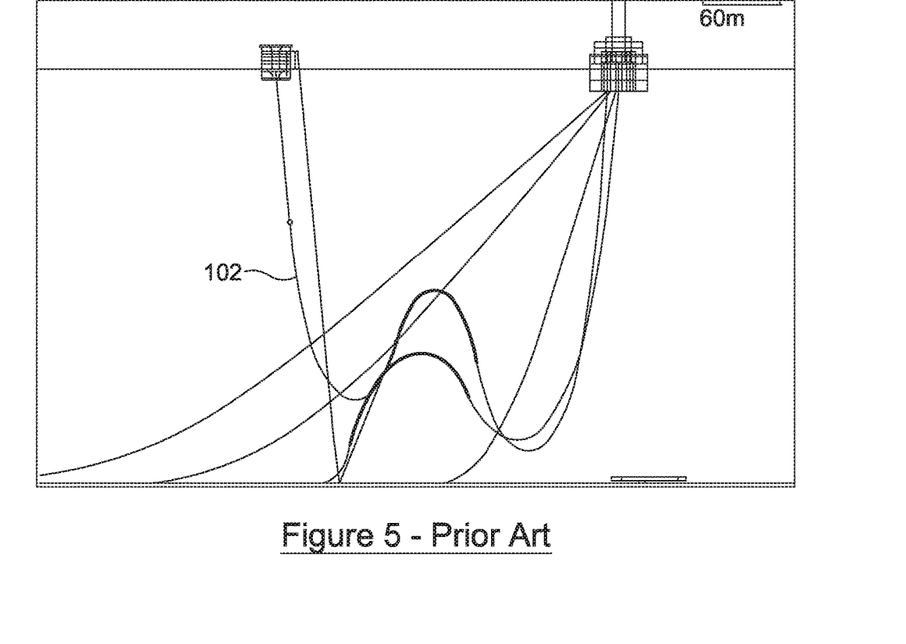

(7) The installation vessel then continues to lower the riser 102 into the water, stepping further away from the platform as it does so (FIG. 5).

(8) The installation vessel installs anchor clamp(s), subsea bend restrictors, subsea tie-in head etc., onto the riser 102 and lowers the subsea end of the riser 102 into the water, suspended by a winch cable. The riser 102 is normally required to be pulled-down, by means of the PDCW or pull-down rope/wire.

(9) When the riser 102 has been lowered to a position over the (previously installed) seabed anchor(s), an intermediate point on the riser 102 is connected to the anchor(s) via tether(s), typically using a remotely operated vehicle (ROV).

Figure 6:
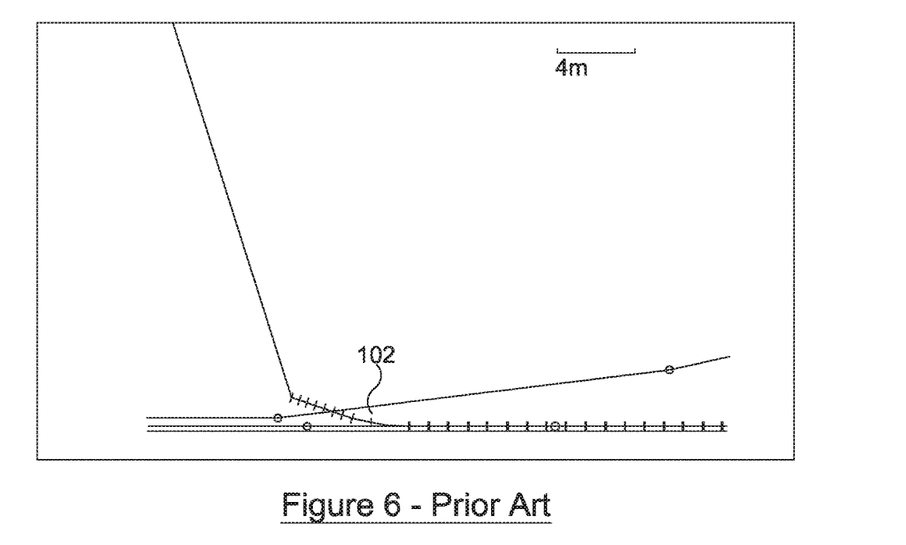

(10) The installation vessel steps further away from the platform, laying the riser 102 along the seabed until, finally, the subsea end of the riser is located in close proximity to the subsea structure to which it is to be connected (FIG. 6, which shows only seabed layout of the new riser). The winch cable is then disconnected.

(11) The subsea end of the riser may be connected to the subsea structure using an appropriate tie-in tool and/or divers and/or an ROV.

WO2011/099869 describes a method of installing a riser, similar to the method described above.

When implementing riser installation and removal using these known procedures, it is necessary for the installation vessel to move close in to the platform (typically 20-40 m away) during the transfer of the topside end of the riser to the platform (FIG. 1), in order to maintain the integrity of the guide tube loads, maintain the bending radius of the riser, and prevent any contact between the riser and the port in the installation vessel through which it is lowered. The fact that the installation vessel must move so close to the platform is a significant disadvantage due to the risk of collision, especially with the riser platform. Indeed, many operators define an exclusion zone in the area adjacent to the riser platform, e.g. typically extending up 250 m away from the riser platform. If vessels do need to enter the exclusion zone, production and other operations must be ceased. Any cessation of production represents a significant expense.

It is noted that procedures similar to those used to install risers may be used to install other types of flexible lines, such as power cables and umbilicals. As such, the same problem is encountered, i.e. the need for an installation vessel to enter the exclusion zone and consequential shut down of operations.

SUMMARY

It is an object of the present invention to overcome or at least mitigate the known riser installation procedures described above. In particular, it is an object of the invention to allow the installation of a riser without requiring a vessel to enter an exclusion zone around a platform.

According to a first aspect of the present invention there is provided a method of installing a flexible line between an offshore platform and a subsea structure. The method comprising at least partially deploying the line in the water using an installation vessel located outside of an exclusion zone in the vicinity of the platform, including lowering a topside end of the line either to the seabed or to an intermediate location between the seabed and the platform. The method further comprises pulling the topside end to a position within the exclusion zone and winching the topside end up to the platform, and coupling the topside end to the platform.

According to an embodiment, said step of pulling the topside end to a position within the exclusion zone may comprise attaching a winch cable to the topside end and winching the topside end to said position within the exclusion zone. The winch cable may be pulled by a subsea winch, a winch located on an assisting vessel, or a winch located on the platform. After pulling the topside end to a position within the exclusion zone, releasing the winch cable from the topside end, attaching a pull-in cable depending from the platform to the topside end either before or after releasing the winch cable from the topside end, and using the pull-in cable to winch the topside end up to the platform.

Where the topside end is lowered to the seabed, the method may further comprise attaching a protective structure and or buoyancy aid to the topside end to prevent damage while the topside end is pulled over the seabed.

The step of pulling the topside end to a position within the exclusion zone may comprise using one or more assisting vessels to pull the topside end into the exclusion zone. The method may further comprise suspending a cable between two assisting vessels located outside the exclusion zone, manoeuvring the assisting vessels to a location between the platform and the installation vessel, attaching the topside end of the line to the cable, and further manoeuvring the support vessels to pull the topside end into the exclusion zone whilst maintaining the assisting vessels outside of the exclusion zone. After pulling the topside end to a position within the exclusion zone, the method may comprise releasing the suspended cable from the topside end, attaching a pull-in cable depending from the platform to the topside end either before or after releasing the suspended cable, and using the pull-in cable to winch the topside end up to the platform. The steps of releasing and attaching may be carried out using an ROV.

Following winching of the topside end up to the platform, and either before or after coupling the topside end to the platform, the method may comprise completing deployment of the line if required and coupling a subsea end of the line to the subsea structure.

According to a second aspect of the present invention there is provided a method of removing a flexible line deployed between an offshore platform and a subsea structure. The method comprising decoupling a topside end of the riser from the platform, and lowering the topside end from the platform and pulling the topside end to a position outside of an exclusion zone in the vicinity of the platform. The method further comprises at least partially removing the line from the water using an installation vessel located outside of the exclusion zone, including raising the topside end of the line onto the installation vessel either from the seabed or from an intermediate location between the seabed and the platform.

The step of pulling the topside end to a position outside of the exclusion zone may comprise using the installation vessel to pull the topside end to said position outside of the exclusion zone. Where the topside end is raised from the seabed, the method may further comprise attaching a protective structure and or buoyancy aid to the topside end to prevent damage while the topside end is pulled over the seabed.

The said step of pulling the topside end to a position outside of the exclusion zone may comprise using one or more assisting vessels to pull the topside end out of the exclusion zone. The method may comprise suspending a cable between two assisting vessels located outside the exclusion zone, attaching the topside end of the line to the cable, and manoeuvring the support vessels to pull the topside end out of the exclusion zone whilst maintaining the assisting vessels outside of the exclusion zone.

The step of at least partially removing the line from the water may comprise attaching the topside end of the riser to a buoyancy module in order to cause the topside end to be located at said intermediate position within the water.

DETAILED DESCRIPTION

In the case of deep water hydrocarbon wells, floating platforms tethered to the seabed are most commonly used as a means of receiving hydrocarbons from the well, storing it if necessary, and delivering it to oil and/or gas tankers. The platforms may be of various types including, for example, semi-submersible platforms and floating production storage and offloading (FPSO) vessels. As has been described above, flexible risers are installed between the floating platform and a subsea structure, such as a christmas tree, using an installation vessel. The riser is generally pre-constructed and mounted on a reel on the installation vessel. The riser is then lowered into the sea from the installation vessel. According to the approach presented here, it is not necessary for the installation vessel to enter the exclusion zone surrounding the platform. As such, safety can be greatly enhanced and any ongoing production need not be interrupted.

Figure 7:
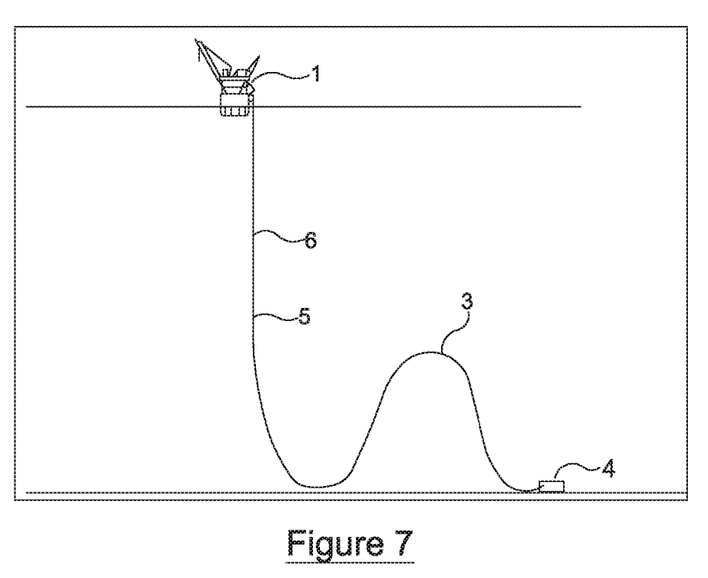
FIGS. 7 to 12 illustrate schematically a procedure according to an embodiment of the invention for installing a flexible riser between a semi-submersible platform and a subsea structure.

FIG. 7 illustrates an installation vessel 1 located outside of an exclusion zone adjacent to a platform 2 (the platform is not shown in the figure but is located to the right of the installation vessel out of view). As shown in FIG. 7, a flexible riser 3 has been partially deployed outside of the exclusion zone according a procedure that involves firstly lowering the topside end 4 of the riser to the seabed. The subsea end 5 of the riser is, at this stage, suspended by a crane wire 6 that depends from a crane mounted on the installation vessel 1 (or, possibly, the subsea end 5 is still located on the IV). The riser has a reverse pliant wave configuration, although this is merely exemplary.

Figure 8:
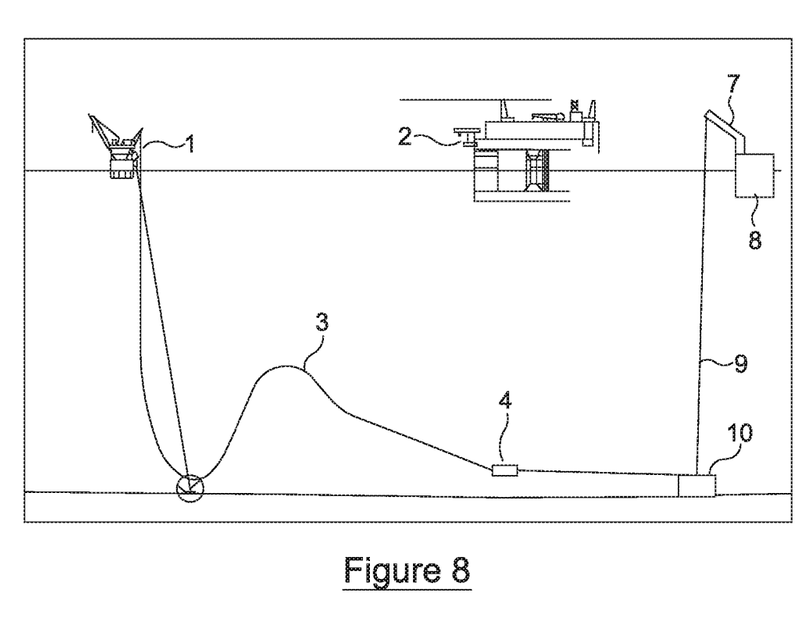

FIG. 8 illustrates a subsequent stage of the riser installation procedure. This involves the use of a winch (or crane) 7 mounted on an assisting vessel 8. The assisting vessel is stationed on the opposite side of the platform 2 from the installation vessel 1. As the exclusion zone extends only on that side of the platform where the installation vessel is located, the assisting vessel 8 can move close in to the platform if required. A winch cable 9 is suspended from the winch 7 and extends around an anchoring device 10 secured to the seabed. The anchoring device may be, for example, a clump weight or a suction anchor. In another implementation, rather than extending up to a support vessel, the winch cable 9 may extend up to the platform 2 itself, with the platform performing the winching operations. In an alternative implementation, the winch may comprise a powered winch fixed to the seabed, e.g. at the location of the anchoring device 10 shown in FIG. 8.

Figure 9:
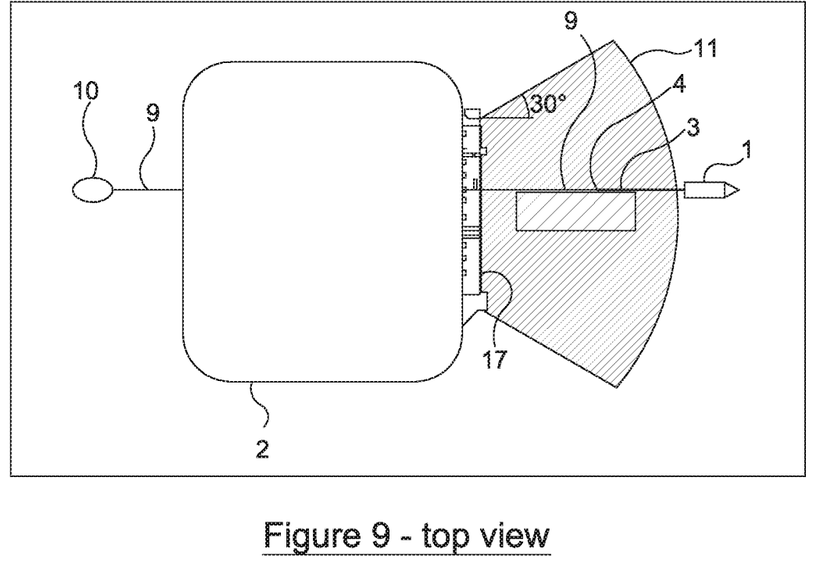
Figure 10:
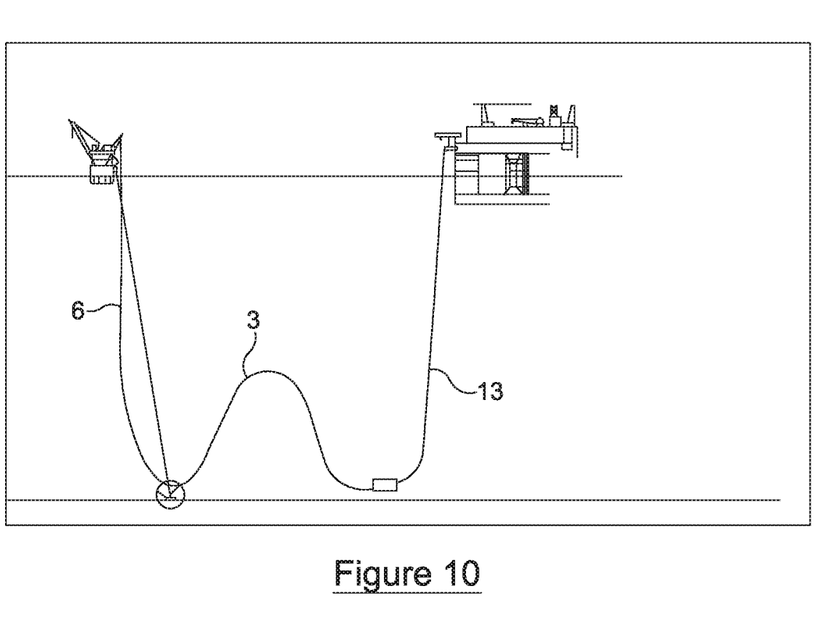
Figure 11:
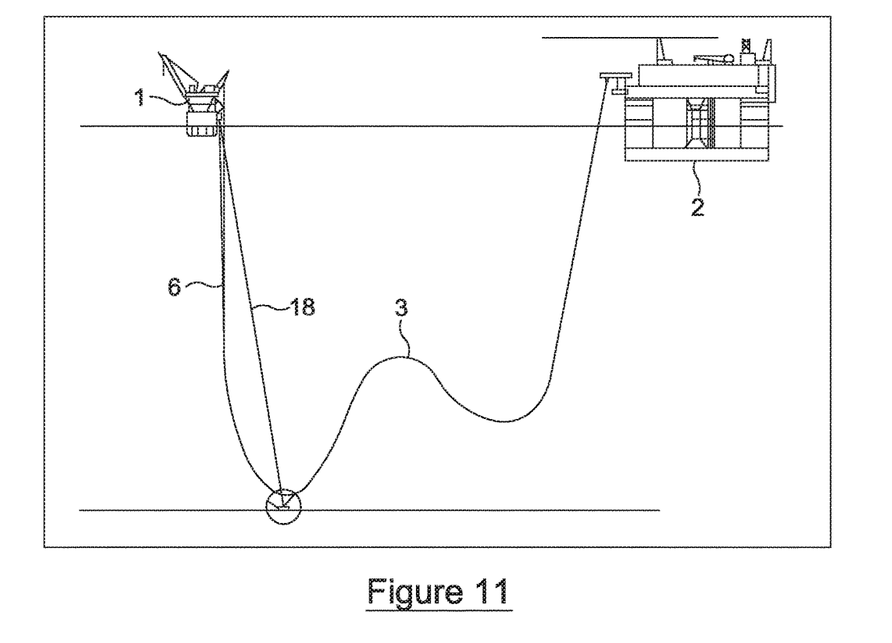

Prior to the configuration illustrated in FIG. 8, an end of the winch cable 9 has been pulled by a remotely operated vehicle (ROV, not shown) to a location adjacent to the topside end 4 of the riser. The ROV attaches the end of the winch cable 9 to the topside end. FIG. 9 illustrates the platform 2 and its environs in plan view, illustrating in particular the installation vessel 1, the riser 3, and the winch cable 9, as well as the exclusion zone 11. The figure illustrates the process as the winch 7 has begun to pull the topside end 4 of the riser 3 through the exclusion zone 11 and towards a location on the seabed adjacent to the platform 2. A protection and/or sliding structure may be installed to the topside end of the riser to reduce the seabed friction and protect the riser as it is pulled towards the platform. Buoyancy modules can also be attached to the riser to reduce the required pull force and to prevent the riser from becoming buried in the seabed. Once the topside end 4 is in the appropriate position close in to the platform, an ROV disconnects it from the winch cable 9, and connects the topside end to a pull in wire 13 suspended from the platform (see FIG. 10). Thereafter, the topside end of the riser is pulled up to the platform. The topside end of the riser is then connected to the platform as required. This configuration is illustrated in FIG. 11. [Note: In a modification to this procedure, the pull in wire 13 may be used to pull the riser topside end 4 towards the platform, avoiding the need for an additional winch. The anchoring device should be "module-based" as ROVs will need to lift/fly the modules into position inside the exclusion zone (at a location on the seabed underneath the platform wire exit location or guide tube on the platform), and build up the anchoring device until the required weight of the assembly is achieved.]

Figure 12:
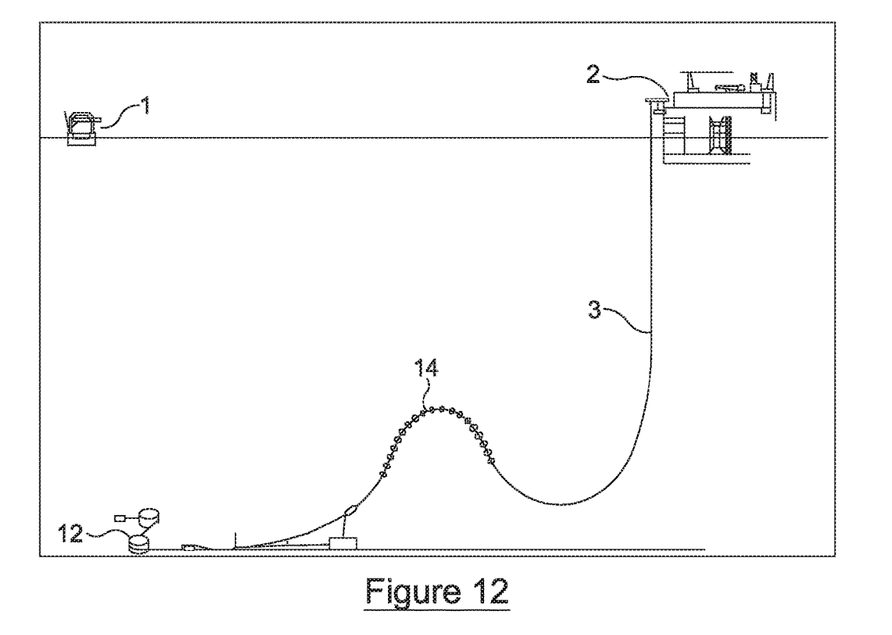

At this stage, the installation vessel installs anchor clamp(s), subsea bend restrictors, subsea tie-in head etc, onto the riser 3 and lowers the subsea end 5 of the riser into the water, suspended by the crane wire 6. The riser is normally required to be pulled-down, e.g. by means of a pull-down wire 18 (or pull-down clump weight, PDCW). When the riser has been lowered to a position over the (previously installed) seabed anchor(s), an intermediate point on the riser is connected to the anchor(s) via tether(s), typically using a remotely operated vehicle (ROV). The next stage in the procedure is for the installation vessel 1 to step away from the platform, using the crane wire 6 to further lower the subsea end 5 of the riser 3 from the vessel, laying the riser horizontally along the seabed as it does so. The subsea end finally arrives at the subsea structure 12, and can be connected to it, e.g. using a tie-in tool (or merely laid down on the seabed for connection to the subsea structure 12 at a later stage). The connected riser is illustrated in FIG. 12, which also shows the buoyancy modules 14 installed earlier in the process.

Whilst the riser installation procedure has been described above with a certain sequence or ordered steps, it will be appreciated that the order in which these steps are carried out may be varied. For example, it is possible to carry out the procedure by first lowering the subsea end 5 of the riser into the water first.

It will be appreciated that a procedure for removing a riser will follow the reverse procedure to that described with reference to FIGS. 7 to 12, i.e. commencing with disconnection of the subsea end of the riser from the subsea structure and raising of that end to the installation vessel, an intermediate step of pulling/stepping the topside end of the riser out of the exclusion zone towards the installation vessel, and a final step of raising the remainder of the riser up to the installation vessel is performed when it is located outside the exclusion zone. It is noted that the installation vessel itself may be used to pull the topside end of the riser out of the exclusion zone, avoiding the need for a winch (for the stage). Of course, a winch may be used (as per FIG. 8) to act as holdback to the pulling operation, affording further control.

The approach presented here provides a reversible method for the installation and removal of a flexible element comprising a riser or other flexible line (such as a power line or umbilical) or tube) between an offshore platform and a subsea structure. The approach avoids the need for the installation vessel to enter a defined exclusion zone in the vicinity of the platform during the installation or removal process and therefore may avoid the need to shut down platform operations, such as hydrocarbon production.

Figure 13:
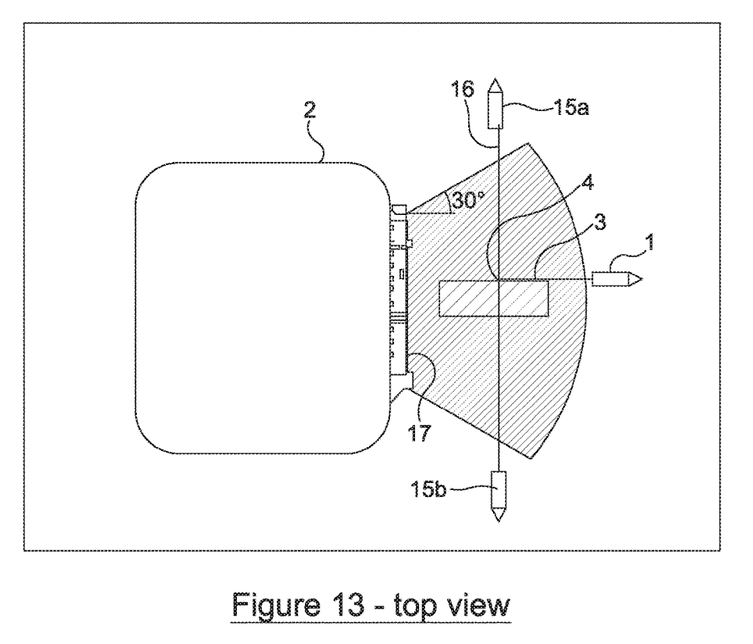
FIG. 13 illustrates schematically a procedure according to an alternative embodiment of the invention for installing a flexible riser between a semi-submersible platform and a subsea structure and which employs a pair of assisting vessels.

FIG. 13 illustrates an alternative riser installation procedure which again relies on pulling/transferring a topside end 4 of the riser 3 from a location outside of the exclusion zone to a location adjacent to the platform 2. This procedure requires the use of two off anchor handling vessels 15a, 15b light construction vessels (LCVs), platform supply vessels (PSVs) or similar, in addition to the riser installation vessel 1. These two additional vessels are referred to here as assisting vessels (AVs). The riser 3 is installed outside of the exclusion zone as per the procedure described with reference to FIGS. 7 to 12. At some point, the topside end 4 of the riser is coupled to a towing cable 16 suspended between the AVs.

The AVs are located outside of and on each side of the exclusion zone, and move towards the platform 2 in synchrony, pulling the riser 3 into the exclusion zone as they move. The IV 1 follows the move whilst controlling the subsea end of the riser 3. At a certain distance from the platform, a pull-in wire (PIW) from the platform (not shown) is connected to the topside end 4 of the riser and the riser is pulled into the platform hang-off area 17. The IV then completes the riser installation (connecting up tether(s), land subsea end on seabed etc.) as per the above description.

Figure 14:
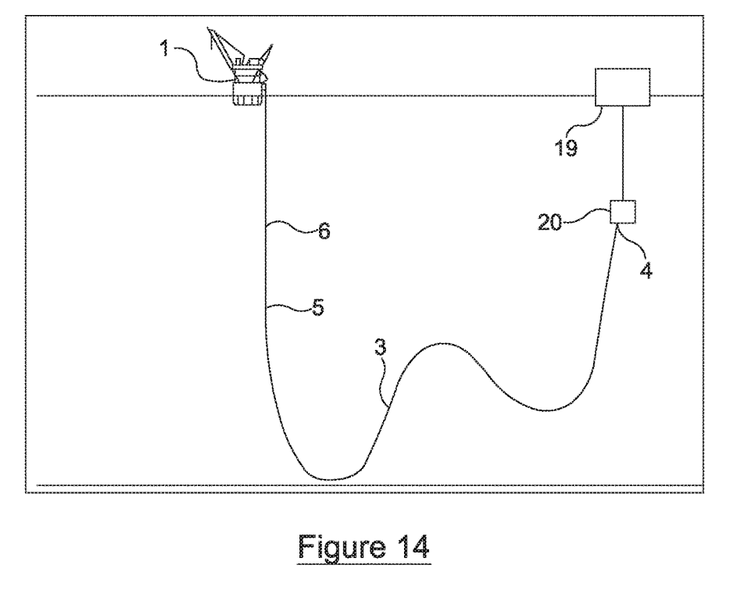
FIG. 14 illustrates schematically a procedure according to a further alternative embodiment of the invention for installing a flexible riser between a semi-submersible platform and a subsea structure and which employs a floating device which is used to suspend a topside end of the riser.

FIG. 14 illustrates a modification to the procedures described above with reference to FIGS. 7 to 13 where the platform 2 is not shown but would be located to the right of the assisting vessel 19 as shown on the page. The modified procedure involves supporting the topside end 4 of the riser 3 by means of a surface or mid water buoy/floating device 20. The floating device 20 is held in the correct position (e.g. using the AV(s) or the described winch) and pulled towards the platform 2 with either one or more assisting vessels or using a winch mounted on the platform or installation vessel (e.g. by means of a winch wire routed through a sheave on the floating device).

According to a further alternative riser installation procedure, the subsea end of the riser is lowered into the water first, and is landed on the seabed. The installation vessel then continues to install the riser (outside of the exclusion zone). The topside end is then transferred to the assisting vessel(s), buoy etc., when made available by the installation vessel. The installation vessel can, if required, re-connect to the subsea end. The remaining activities of the operation are as described above. The buoy/floating device can be designed such that the riser depth/configuration in the water column can be adjusted (sheave with wire/rope back to installation vessel, winch on buoy/floating device, flooding/air filling of compartments etc.). Additionally, the riser configuration during installation can be adjusted with temporary uplift equipment or weights if required.

Figure 15:
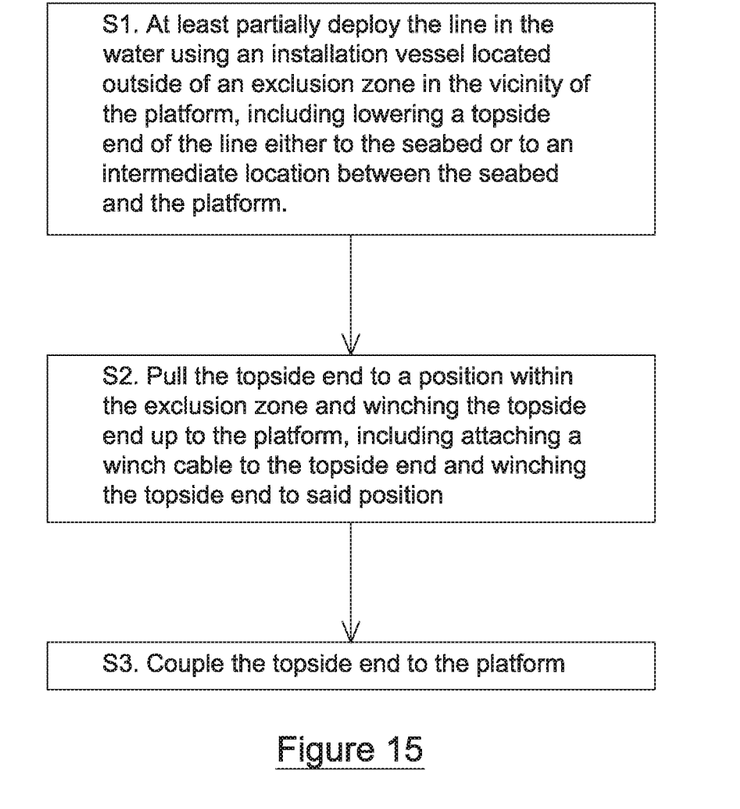
FIG. 15 is a flow diagram further illustrating a procedure for installing a flexible riser.

FIG. 15 is a flow diagram illustrating at a high level a method of installing a flexible line between an offshore platform and a subsea structure. The method comprises, at step S1, at least partially deploying the line in the water using an installation vessel located outside of an exclusion zone in the vicinity of the platform, including lowering a topside end of the line either to the seabed or to an intermediate location between the seabed and the platform. At step S2 the topside end is pulled to a position within the exclusion zone and the topside end winched up to the platform. At step 53 the topside end is coupled to the platform.

Figure 16:
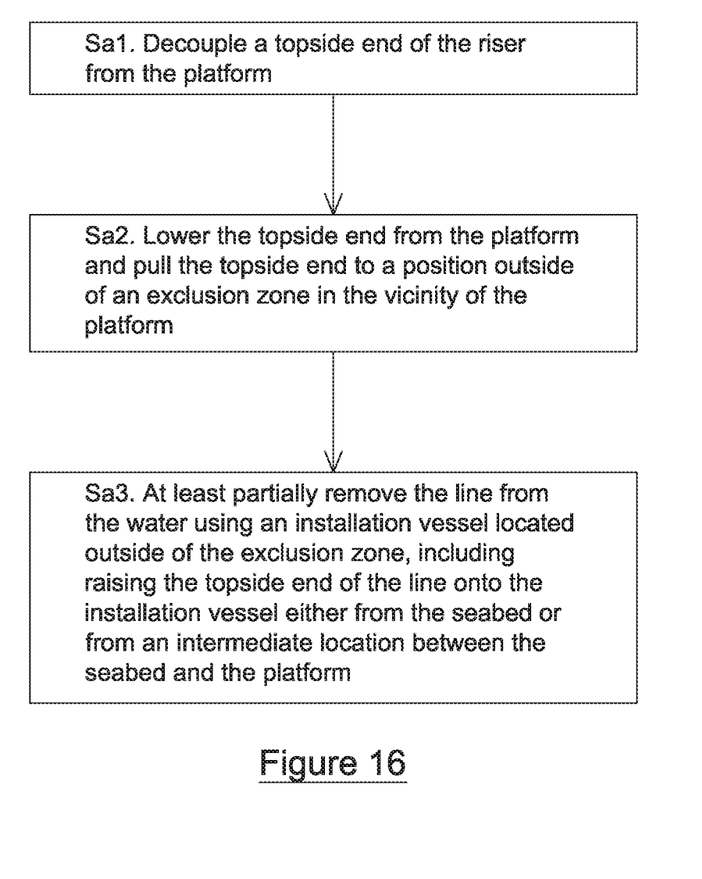
FIG. 16 is a flow diagram further illustrating a procedure for removing a flexible riser.

FIG. 16 is a flow diagram illustrating at a high level a method of removing a flexible line deployed between an offshore platform and a subsea structure. The method comprises, at step Sa1, decoupling a topside end of the riser from the platform and, at step 5a2, lowering the topside end from the platform and pulling the topside end to a position outside of an exclusion 10 zone in the vicinity of the platform. At step 5a3, the line is at least partially removed from the water using an installation vessel located outside of the exclusion zone, including raising the topside end of the line onto the installation vessel either from the seabed or from an intermediate location between the seabed and the platform.

It will be appreciated by the person of skill in the art that various modifications may be made to the above described embodiments without departing from the scope of the present invention.

The invention claimed is:

1. A method of installing a flexible line between an offshore platform and a subsea structure, the method comprising:
   defining an exclusion zone extending outwardly from the platform;
   at least partially deploying the line in the water using an installation vessel located outside of the exclusion zone, including lowering a topside end of the line either to the seabed or to an intermediate location between the seabed and the platform;
   after at least partially deploying the line in the water, attaching a winch cable to the topside end and winching the topside end to a position within the exclusion zone, said winch cable is pulled by a subsea winch, a winch located on an assisting vessel, or a winch located on the platform;
   after winching the topside end to a position within the exclusion zone, releasing the winch cable from the topside end, attaching a pull-in cable depending from the platform to the topside end either before or after releasing the winch cable from the topside end, and using the pull-in cable to winch the topside end up to the platform; and
   coupling the topside end to the platform.

2. The method according to claim 1 and comprising, after pulling the topside end to a position within the exclusion zone, releasing the suspended cable from the topside end, attaching a pull-in cable depending from the platform to the topside end either before or after releasing the suspended cable, and using the pull-in cable to winch the topside end up to the platform.

3. The method according to claim 2 and comprising performing said steps of releasing and attaching using a remote operated vehicle, (ROV).

4. The method according to claim 1 further comprising:
   following winching of the topside end up to the platform, and either before or after coupling the topside end to the platform, either completing deployment of the line and coupling a subsea end of the line to the subsea structure, or
   coupling a subsea end of the line to the subsea structure.

5. The method according to claim 1, the method being implemented to produce a line having one of a reverse pliant wave, pliant wave, free hanging, and lazy S configuration.

6. The method according to claim 1, wherein said step of at least partially deploying a line, or further steps involved in completing deployment of the line, comprise attaching buoyancy modules to a length of the line in order to control the depth and configuration of the line.

7. The method according to claim 1 and comprising deploying a subsea end of the line into the water before the topside end is deployed.

8. The method according to claim 1, wherein said step of at least partially deploying the line in the water comprises attaching the topside end of the line to a buoyancy module in order to cause the topside end to be located at said intermediate location within the water.

9. A method of removing a flexible line deployed between an offshore platform and a subsea structure, the method comprising:
   defining an exclusion zone extending outwardly from the platform;
   decoupling a topside end of the flexible line from the platform;
   lowering the topside end from the platform;
   attaching at least one of a protective structure and a buoyancy aid to the topside end for preventing damage resulting from the topside end being pulled over the seabed;
   pulling the topside end to a position outside of the exclusion zone, wherein the pulling the topside end to the position outside of the exclusion zone comprises:
      suspending a cable between two assisting vessels, the two assisting vessels being located outside the exclusion zone;
      attaching the topside end of the line to the cable; and
      maneuvering the assisting vessels to pull the topside end out of the exclusion zone whilst maintaining the two assisting vessels outside of the exclusion zone; and
   at least partially removing the line from the water using an installation vessel located outside of the exclusion zone, including raising the topside end of the line onto the installation vessel from the seabed.

10. The method according to claim 9, wherein said step of at least partially removing the line from the water comprises attaching the topside end of the line to a buoyancy module in order to cause the topside end to be located at said intermediate location within the water.

11. A method of installing a flexible line between an offshore platform and a subsea structure, the method comprising:
- defining an exclusion zone extending outwardly from the platform;
- at least partially deploying the line in the water using an installation vessel located outside of the exclusion zone, including lowering a topside end of the line to the seabed;
- attaching at least one of a protective structure and a buoyancy aid to the topside end for preventing damage resulting from the topside end being pulled over the seabed;
- pulling the topside end to a position within the exclusion zone, wherein the pulling the topside end to the position within the exclusion zone comprises:
  - suspending a cable between two assisting vessels, the two assisting vessels being located outside the exclusion zone;
  - maneuvering the assisting vessels to a location between the platform and the installation vessel, attaching the topside end of the line to the cable; and
  - further maneuvering the assisting vessels to pull the topside end into the exclusion zone whilst maintaining the two assisting vessels outside of the exclusion zone;
- winching the topside end up to the platform; and
- coupling the topside end to the platform.

* * * * *